United States Patent
Nagaraj et al.

(10) Patent No.: US 8,976,858 B2
(45) Date of Patent: Mar. 10, 2015

(54) ERROR RESILIENCE USING OUT OF BAND DIRECTORY INFORMATION

(75) Inventors: Thadi M. Nagaraj, San Diego, CA (US); Bruce Collins, San Diego, CA (US); Amnon Silberger, La Jolla, CA (US); Gordon Kent Walker, Poway, CA (US); Serafim S. Loukas, Carlsbad, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1578 days.

(21) Appl. No.: 11/435,050

(22) Filed: May 15, 2006

(65) Prior Publication Data

US 2006/0268841 A1 Nov. 30, 2006

Related U.S. Application Data (60) Provisional application No. 60/680,809, filed on May 13, 2005, provisional application No. 60/789,454, filed on Apr. 4, 2006.

(51) Int. Cl.
  *H04N 7/12* (2006.01)
  *H04L 29/06* (2006.01)
  *H04L 1/00* (2006.01)

(52) U.S. Cl.
  CPC ........ *H04L 29/06027* (2013.01); *H04L 1/0083* (2013.01); *H04L 65/607* (2013.01); *H04L 65/80* (2013.01)
  USPC .................................................. 375/240.01

(58) Field of Classification Search
  CPC ............... H04L 1/0083; H04L 65/607; H04N 21/23424; H04N 21/44016
  USPC ........................................................ 375/240.01
  See application file for complete search history.

(56) References Cited

U.S. PATENT DOCUMENTS

| 6,029,200 A | 2/2000 | Beckerman et al. |
| 6,959,020 B1 * | 10/2005 | Hourunranta et al. ........ 370/542 |

(Continued)

FOREIGN PATENT DOCUMENTS

| FI | WO 2005/032139 | * | 4/2005 | .................... 370/474 |
| GB | 2399726 | | 9/2004 | |

(Continued)

OTHER PUBLICATIONS

International Search Report and Written Opinion—PCT/US2006/18853, International Search Authority—European Patent Office—Aug. 17, 2007.

*Primary Examiner* — Richard Torrente
(74) *Attorney, Agent, or Firm* — Dang Vo; John Rickenbrode (57) ABSTRACT

A method and apparatus to improve error resiliency in processing a multimedia bitstream is described. A directory of header information is generated for a multimedia bitstream. The directory information comprises packet header information associated with the multimedia bitstream. The directory information may be transmitted to a receiver along with the multimedia bitstream. A receiver of the multimedia bitstream and the directory can utilize the header information to identify and locate packets within and subsequent to erroneous data in the received bitstream. By identifying and locating packets that may otherwise be discarded, the receiver may be able to improve error recovery and decoding of the multimedia data.

43 Claims, 6 Drawing Sheets

(56) References Cited

U.S. PATENT DOCUMENTS

| | | |
|---|---|---|
| 7,373,075 B1* | 5/2008 | Ando et al. .................. 386/334 |
| 2001/0009548 A1* | 7/2001 | Morris ......................... 370/392 |
| 2002/0174434 A1 | 11/2002 | Lee et al. |
| 2003/0031198 A1* | 2/2003 | Currivan et al. ............. 370/465 |
| 2004/0199565 A1* | 10/2004 | Visharam et al. ............ 709/201 |
| 2005/0203927 A1* | 9/2005 | Sull et al. .................... 707/100 |
| 2005/0210356 A1* | 9/2005 | Chou et al. .................. 714/752 |
| 2007/0258487 A1* | 11/2007 | Puputti ........................ 370/474 |

FOREIGN PATENT DOCUMENTS

| | | |
|---|---|---|
| JP | 4282936 A | 10/1992 |
| JP | 8191284 A | 7/1996 |
| JP | 2003124993 A | 4/2003 |
| WO | WO2004095827 A2 | 11/2004 |

\* cited by examiner

ERROR RESILIENCE USING OUT OF BAND DIRECTORY INFORMATION

CROSS-REFERENCE TO RELATED APPLICATIONS

The present application for patent claims priority to Provisional Application No. 60/789,454 entitled "IMPROVING ERROR RESILIENCE USING OUT OF BAND DIRECTORY INFORMATION" filed Apr. 4, 2006, and assigned to the assignee hereof, and to Provisional Application No. 60/680,809 entitled "METHODS AND APPARATUS FOR IMPROVING PACKET ERROR RESILIENCY USING OUT-OF-BAND DIRECTORY INFORMATION" filed May 13, 2005, and assigned to the assignee hereof, both of which are hereby expressly incorporated by reference herein.

BACKGROUND OF THE INVENTION

1. Field of the Invention

This invention relates to methods and apparatus for encoding and decoding digital data with error management schemes.

2. Description of the Related Art

Due to the explosive growth and great success of the Internet and wireless communication, as well as increasing demand for multimedia services, streaming media over the Internet and mobile/wireless channels has drawn tremendous attention. In heterogeneous Internet Protocol (IP) networks, video is provided by a server and can be streamed by one or more clients. Wired connections include dial-up, integrated services digital network (ISDN), cable, digital subscriber line protocols (collectively referred to as xDSL), fiber, local area networks (LAN), wide area networks (WAN) and others. The transmission mode can be either uni-cast or multi-cast.

Similar to the heterogeneous IP network is mobile/wireless communication. Transport of multimedia content over mobile/wireless channels is very challenging because these channels are often severely impaired due to multi-path fading, shadowing, inter-symbol interference, and noise disturbances. Some other reasons such as mobility and competing traffic also cause bandwidth variations and loss. The channel noise and the number of users being served determine the time-varying property of channel environments.

The demands of higher data rates and higher quality of service in both heterogeneous IP networks and mobile communication systems are growing rapidly. However, factors such as limited delay times, limited transmit power, limited bandwidth and multi-path fading continue to restrict the data rates handled by practical systems. In multimedia communications, particularly in error-prone environments, error resilience of the transmitted media is critical in providing the desired quality of service because errors in even a single decoded value can lead to decoding artifacts propagating spatially and temporally. Various encoding measures have been used to reduce errors while maintaining a necessary data rate, however all of these techniques suffer from problems with errors arriving at the decoder side.

Through the use of a source encoder, data is compressed—conveying the maximum information by expending the minimum number of bits, followed by a channel encoder that tends to maximize the capacity of the transmission channel for a given probability of error in receiving these bits.

Channel coding, for example, Reed-Solomon coding, is used to improve the robustness of the source-coded data. Joint source-channel coding methodologies have been used to provide varying levels of error protection to source coded data with varying levels of importance or to enable rate adaptation of coded video data to available network bandwidth through partitioning and dropping packets. This is because the common transport protocols do not deliver corrupted data to the source decoder.

Source coding techniques such as reversible variable length coding (e.g. in MPEG-4) have been used for error recovery by decoding the packet in the reverse order when corrupt packets are in fact received. There is a compromise in coding efficiency with source coding techniques, which translates to quality of decoded video for a given bit rate.

Hybrid coding standards, such as MPEG-1, MPEG-2, MPEG-4 (collectively referred to as MPEG-x), H.261, H.262, H.263, and H.264 (collectively referred to as H.26x), use resynchronization points in the bitstream as the main method of handling errors at the decoder.

Another reason that can cause data loss in excess of the initial corruption is due to incorrect codeword emulation. The identification of the initial bit error position is not a trivial task and typically is not possible without a special design supporting the identification of bit error positions in a MAC layer or physical layer component. Hence, upon detecting bitstream corruption, the decoder may have to stop decoding and move forward in the bitstream to find the next resynchronization point, and in the process necessarily skipping a sizeable amount of potentially healthy data. Although emulation of a different codeword, which is the same length as the original, i.e. authentic, codeword might seem to be less of a problem with respect to the sequence of events described above, this is actually not the case. There are many ways in which this kind of an error may lead to failures in a decoder's correct bitstream interpretation. For example, in most current codecs there are objects in the bitstream (compression related parameters) whose values influence the syntax of the following portion of the bitstream. Hence, an incorrect value for such an object can lead to an incorrect bitstream interpretation.

Due to the variable packet lengths commonly used in the hybrid coding standards, information necessary for decoding the variable lengths packets (e.g., packet lengths and/or synchronization information) must be transmitted to the decoding apparatus in order to properly decode the bitstream. Because the common transport protocols rely on various layers of header information (e.g., transport layer headers and/or synchronization layer headers) to deliver this necessary variable packet length and/or synchronization information, the source decoder has a limited ability to handle an erroneous bitstream, with dropping of packets and resynchronization being the most common solution. An improved method of handling bit errors that lead to error propagation and data loss due to problems such as synchronization loss and incorrect codeword emulation, is needed.

SUMMARY OF THE INVENTION

A method of processing multimedia data is provided. The method includes receiving the multimedia data and generating a directory comprising at least a portion of header information associated with the multimedia data. In some aspects the method further includes transmitting the multimedia data and transmitting the directory.

A processor for processing multimedia data is provided. The processor is configured to receive the multimedia data, and to generate a directory comprising at least a portion of header information associated with the multimedia data. In some aspects, the processor is also configured to transmit the multimedia data, and to transmit the directory.

An apparatus for processing multimedia data is provided. The apparatus includes a receiver to receive the multimedia data, and a generator to generate a directory comprising at least a portion of header information associated with the multimedia data. In some aspects, the apparatus also includes a transmitter to transmit the multimedia data and the directory.

An apparatus for processing multimedia data is provided. The apparatus includes means for receiving the multimedia data, and means for generating a directory comprising at least a portion of header information associated with the multimedia data. In some aspects, the apparatus also includes means for transmitting the multimedia data and the directory.

A computer readable medium embodying a method of processing multimedia data is provided. The method includes receiving the multimedia data, and generating a directory comprising at least a portion of header information associated with the multimedia data. In some aspects, the method also includes transmitting the multimedia data, and transmitting the directory.

A method of processing multimedia data is provided. The method includes receiving a multimedia data stream, and receiving a directory comprising at least a portion of header information associated with the multimedia data stream. In some aspects, the method also includes decoding some of the multimedia data stream using the directory.

A processor for processing multimedia data is provided. The processor is configured to receive a multimedia data stream, and receive a directory comprising at least a portion of header information associated with the multimedia data stream. In some aspects the processor is also configured to decode some of the multimedia data stream using the directory.

An apparatus for processing multimedia data is provided. The apparatus includes a receiver to receive a multimedia data stream and to receive a directory comprising at least a portion of header information associated with the multimedia data stream, and a memory to store at least a portion of the received directory. In some aspects, the apparatus also includes a decoder to decode at least a portion of the multimedia data stream using the directory.

An apparatus for processing multimedia data is provided. The apparatus includes means for receiving a multimedia data stream, and for receiving a directory comprising at least a portion of header information associated with the multimedia data stream, and means for storing at least a portion of the directory. In some aspects, the apparatus also includes means for decoding at least a portion of the multimedia data stream using the directory.

A computer readable medium embodying a method of processing multimedia data is provided. The method includes receiving a multimedia data stream, and receiving a directory comprising at least a portion of header information associated with the multimedia data stream. In some aspects the method also includes decoding some of the multimedia data stream using the directory.

DETAILED DESCRIPTION OF THE PREFERRED EMBODIMENT

A method and apparatus to improve packet error resiliency in decoding a multimedia data stream, is described. An encoder device may identify header information associated with various packets contained in one or more layers (e.g., a transport layer and/or a synchronization layer) of the multimedia data stream. The header information may include a packet size, a packet number, a location of another header within a packet, a data sequence time, a data sequence duration, a frame time, a frame number, a random access point flag, a frame rate or a number of associated packets in a group of packets. A directory of the header information is generated and transmitted to a decoder to be used by the in case some of the original header information within the data stream is lost in transmission or is received in error. In some aspects, the directory containing the header information is transmitted over a communication link such as a channel other than the communication link over which the data packets containing the original headers are transmitted. Thus, a decoder receiving the directory may use the header information for locating a data packet in a received multimedia data stream. In a case where erroneous packets are received by the decoder, the decoder may use the directory header information to facilitate recovery of data that would have been lost. In the following description, specific details are given to provide a thorough understanding of the embodiments. However, it will be understood by one of ordinary skill in the art that the embodiments may be practiced without these specific details. For example, electrical components may be shown in block diagrams in order not to obscure the embodiments in unnecessary detail. In other instances, such components, other structures and techniques may be shown in detail to further explain the embodiments. It is also understood by skilled artisans that electrical components, which are shown as separate blocks, can be rearranged and/or combined into one component.

It is also noted that some embodiments may be described as a process, which is depicted as a flowchart, a flow diagram, a structure diagram, or a block diagram. Although a flowchart may describe the operations as a sequential process, many of the operations can be performed in parallel or concurrently and the process can be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 1:
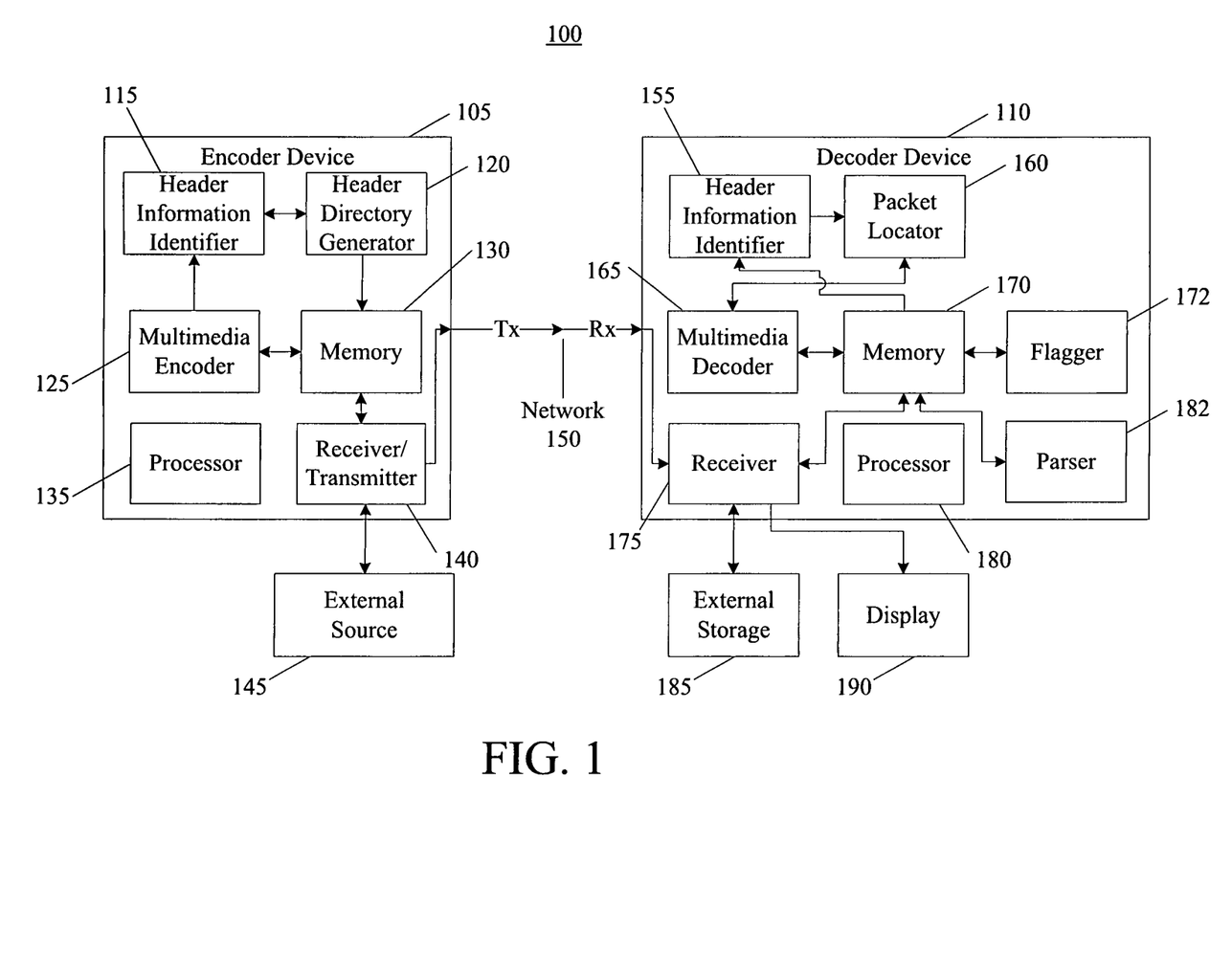
FIG. 1 is an illustration of an example of a communication system for delivery of streaming video.

FIG. 1 is an illustration of an example of a communication system for delivery of streaming video. System 100 includes encoder device 105 and decoder device 110. Communication devices such as the encoder device 105 and the decoder device 110 may use a multi-layer protocol stack used for distributing tasks. Upper layer components in the encoder device 105 and the decoder device 110 may include multiple applications such as, for example video or audio encoders and/or decoders. Some embodiments may include multiple streams of information that are meant to be decoded simultaneously. In these cases, synchronization tasks of the multiple streams may also performed in upper layer components. In the encoder device 105, an upper layer component may provide encoded timing information in the bitstream that is transmitted over a wireless network and/or a wired network 150. In the decoder device 110, an upper layer component may parse the multiple streams of information such that the associated applications decode them at about the same time.

Lower layer components in the encoder device 110 may include various schemes to provide for error resiliency. Error prone channels such as the wired and/or wireless network 150 may introduce errors into the bitstream received by the decoder device 110. Such error resiliency schemes provided in lower layer components may include one or more error control coding schemes, interleaving schemes and other schemes that are known to those of skill in the art. Lower layer components in the decoder device 110 may include the corresponding error decoding components that enable detection and correction of errors. Some errors that are introduced over the wired and/or wireless network 150 may not be correctable by the lower layer components of the decoder device 110. For those errors that are not correctable, solutions such as requesting retransmission of corrupt components by lower layer components of the encoder device 105 may not be feasible for some situations.

Figure 2:
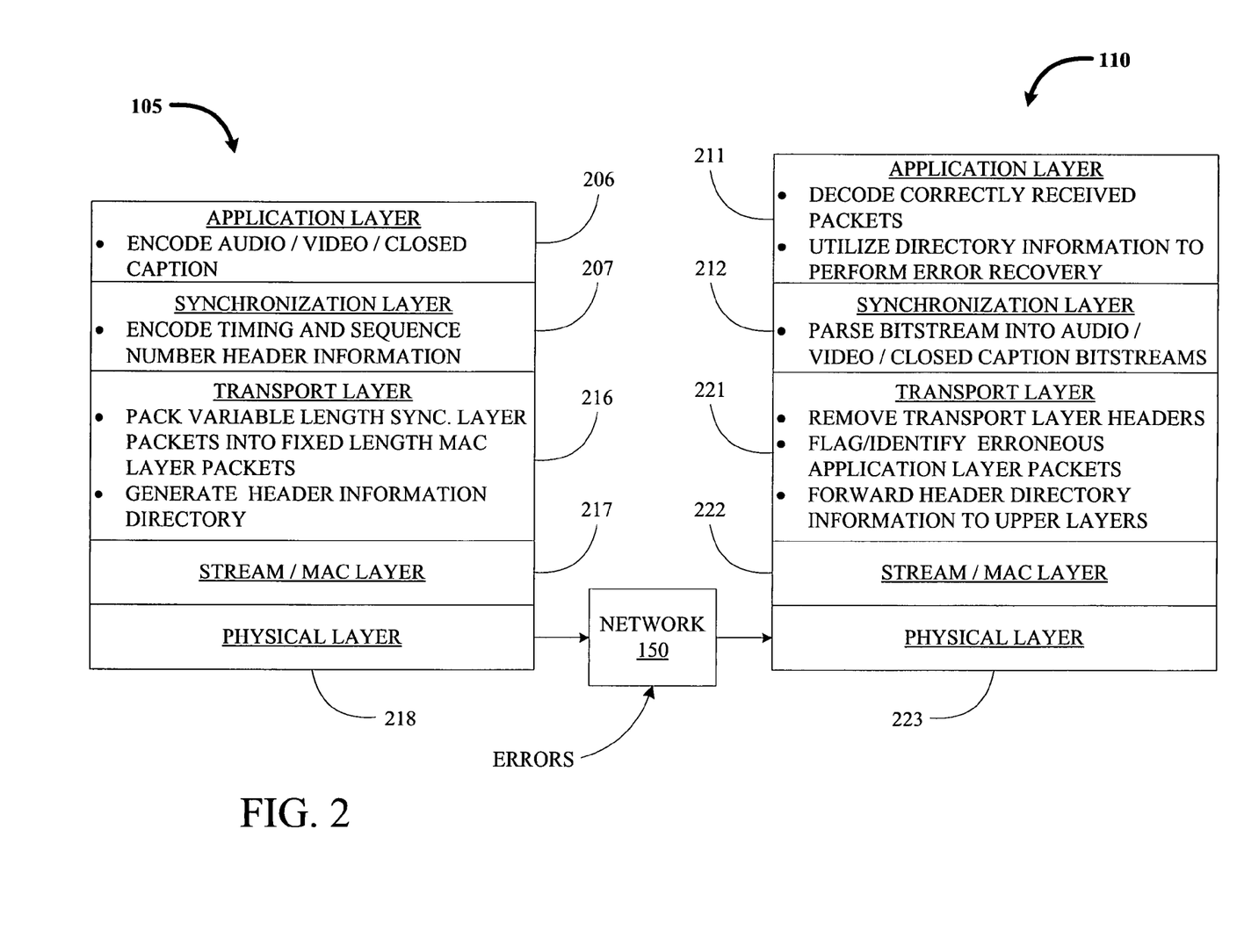
FIG. 2 is a block diagram of an example of a multi-layer protocol stack used for dividing tasks in the encoder device 105 and the decoder device 110 of FIG. 1.

FIG. 2 is a block diagram of an example of a multi-layer protocol stack used for dividing tasks in the encoder device 105 and the decoder device 110. Upper layer components of the encoder device 105 are distributed in one or more of an application layer 206 and a synchronization layer 207. Lower layer components of the encoder device 105 are distributed into one or more of a transport layer 216, a stream and/or medium access control (MAC) layer 217, and a physical layer 218. Similarly, Upper layer components of the decoder device 110 are distributed in one or more of an application layer 211 and a synchronization layer 212. Lower layer components of the decoder device 110 are distributed into one or more of a transport layer 221, a stream and/or medium access control (MAC) layer 222, and a physical layer 223. Those of skill in the art will recognize these layers and be familiar with the allocation of various tasks among them.

With reference to FIGS. 1 and 2, the encoder device 105 further includes a header information identifier 115, a header directory generator 120, a multimedia encoder 125, a memory component 130, a processor 135, and a receiver/transmitter 140. Processor 135 generally controls the overall operation of the exemplary encoder device 105.

Header information identifier component 115 identifies information, e.g., in headers related to various layers of communication, regarding the packetization of multimedia data. In some examples, packetization is performed at various levels to allow multiple streams of data to be split up (parsed) in the encoding process and to be reassembled during decoding using, at least in part, header information that was added by the various layers of the encoder. For example, the synchronization layer 207 may add header information identifying multiple types of packets being linked with multiple decoder components that may decode the multiple types of packets simultaneously. The synchronization layer header information may include fields identifying a data sequence time, a data sequence duration, the destination decoder component (e.g., audio, video and closed caption), frame number, packet number and other information. Synchronization layer packets may be variable length in some examples. This may be due to the various encoding schemes such as, for example, digital compression schemes including variable length coding schemes.

Other types of packets that may be identified by the header information identifier 115 may include fixed length packets such as may be utilized in the transport layer 216. Transport layer packets may be fixed length in order to support various error coding schemes, modulation schemes and other schemes that use fixed length packets. The transport headers may contain information identifying the number of transport layer packets that were parsed from a single synchronization layer packet. If the synchronization layer packet is variable length, then the number of transport layer packets needed to contain the data may be variable as well.

The header information identifier 115 can also identify information for use by a decoder to identify the length, e.g., in bits or bytes, of the various packets. Since some packets are of variable length, and even fixed length packets from different sources may be of different length, the packet length may be needed to reconstruct packets. Depending on the nature of the packet length information, positions of packets within another packet (e.g., locations of several transport layer packets with one larger synchronization layer packet) may also be determined indirectly (using, e.g., accumulated packet size information) or directly. Details of how a decoder may use the various forms of header information identified by the header information component 115 will be discussed below.

The header directory generator 120 takes at least some of the information identified by the header information identifier 115 and generates a directory. The directory may include header information related to various layers, such as the application layer 206, the synchronization layer 207, the transport layer 217 and others. The information may be used by a decoder device in recovering from various errors including, identifying the size of erroneous packets received in error, identifying the next available packet in order to resynchronize and others. Header information from the header directory can be used to replace the lost or erroneous original header information within the data stream.

The multi-media encoder 125 may include subcomponents including a transformer/quantizer component that transforms and/or quantizes video (or audio or closed caption text) data from the spatial domain to another domain, such as the frequency domain in the case of DCT (discrete cosine transform). The multimedia encoder may also include an entropy encoder component. The entropy encoder component may use a context-adaptive variable length coding (CAVLC). Encoded data may include quantized data, transformed data, compressed data, or any combinations thereof. Memory component 130 is used to store information such as raw video data to be encoded, encoded video data to be transmitted, header information, the header directory, or intermediate data being operated on by the various encoder components.

In this example, the receiver/transmitter component 140 contains circuitry and/or logic used to receive data to be encoded from external source 145. External source 145 could be, for example, external memory, the Internet, a live video and/or audio feed, and receiving the data can include wired and/or wireless communications. Transmitter 140 also contains circuitry and/or logic, e.g. a transmitter, to transmit (Tx) encoded data over Network 150. Network 150 can be part of a wired system such as telephone, cable, and fiber optic, or a wireless system. In the case of wireless communication systems, network 150 can comprise, for example, part of a code division multiple access (CDMA or CDMA2000) communication system or alternately, the system can be a frequency division multiple access (FDMA) system, an orthogonal frequency division multiple access (OFDMA) system, a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA), a high data rate (1xEV-DO or 1xEV-DO Gold Multicast) system, or in general any wireless communication system employing a combination of techniques.

The transmitted data may include multiple bitstreams, such as video, audio and/or closed caption. In some examples the transmitted data also includes at least a portion of the header directory. In some examples the header directory is transmitted on a different channel (virtual or actual) other than the channel over which the multiple bitstreams are transmitted.

It should be noted that encoder device 105 is a simplified example for purposes of explanation. Accordingly, one or more elements of encoder device 105 shown in FIGS. 1 and/or 2 may be omitted, rearranged and/or combined. For example, processor component 135 may be external of encoder device 105.

Decoder device 110 contains similar components as encoder device 105, including header information identifier 155, packet locator 160, multimedia decoder 165, memory component 170, flagger 172, receiver 175, processor 180, and parser 182. Decoder device 110 receives encoded multimedia data that has been transmitted over network 150 or from external storage 185. The receiver 175 contains circuitry and/or logic used for receiving (Rx) encoded data in conjunction with network 150, as well as logic for receiving encoded data from external storage 185. External storage 185 could be, for example, external RAM or ROM, or a remote server. In addition to receiving multimedia bitstreams, the receiver 175 can receive the header directory that was generated in the header directory generator 120.

The multimedia decoder 165 contains circuitry and/or logic used in decoding the received encoded multimedia bitstreams. Subcomponents of the multimedia decoder 165 may include a dequantization component, an inverse transform component, and various error recovery components. Correctly received packets can be decoded by the corresponding components of the application layer 211. The error recovery components may include lower level error detection and correction components (such as Reed-Solomon coding and/or Turbo-coding) as well as upper layer error recovery and/or error concealment used to replace and/or conceal data not correctable by the lower layer methods. The various error recovery components may benefit from the information contained in the header directory that was generated by the header directory generator 120 of the encoder device 105. Subcomponents of the multimedia decoder 165 may reside in the application layer 211, the synchronization layer 212, the transport layer 221, the stream/MAC layer 222, the physical layer 223 or combinations thereof.

The header information identifier 155 contains circuitry and/or logic used in identifying information (e.g., header information) contained in the received header directory. When an erroneous packet is received by the decoder device 110, the header information identifier 155 identifies information in the header directory that may be used to identify the location of a subsequent packet in the bitstream. Header information in the header directory may also be used to replace the erroneously received header information in the erroneous packet or to locate and remove an extra erroneously received header in the packet. Packet locator 160 contains circuitry and/or logic used in locating the packet using the identified header directory information. In some examples, higher layer packets (e.g., application layer packets) that are located inside an erroneous lower level packet (e.g., a transport layer and/or synchronization layer packet) may be flagged as being erroneous. Flagger 172 contains circuitry and/or logic used in flagging erroneous packets. By flagging packets that may be erroneous due to their location in another erroneous packet, higher layer components (e.g., application layer components) may make error recovery decisions. The application layer 211 components may use the header directory information and the packet locator 160 in locating the erroneous application layer packets to perform various error recovery actions.

Since multiple bitstreams may be received by the decoder device 110, the erroneous packets may be located in the multiple bitstreams. Parser 182 may be used at the lower layers as well as the synchronization layer 212 to parse the correctly received and erroneous packets and forward them to the appropriate application layer 211 components of the multimedia decoder 165. In addition, the necessary header directory information may also be forwarded from the transport layer 221 to the upper layers (e.g., the synchronization layer 212 and/or the application layer 211) to allow identification of erroneous packets for purposes of error recovery and/or resynchronization of the bitstream. The transport layer 221 usually removes the transport layer header information from the packets that are forwarded to the upper layers.

The decoded multimedia data can be displayed with display component 190, stored in external storage 185, or stored in internal memory component 170. Display component 190 can be an integrated part of the decoder device 110. The display component 190 contains such parts as video and/or audio display hardware and logic, including a display screen and/or speakers. The display component 190 may also be an external peripheral device. In this example, the receiver 175 also contains logic used to communicate the decoded multimedia data to external storage component 185 or display component 190.

It should also be noted that the decode device 110 is a simplified example for purposes of explanation. Therefore, one or more elements of decoder device 110 shown in FIGS. 1 and/or 2 may be omitted, rearranged and/or combined. For example, the processor 180 may be external of the decoder device 110.

Figure 3:
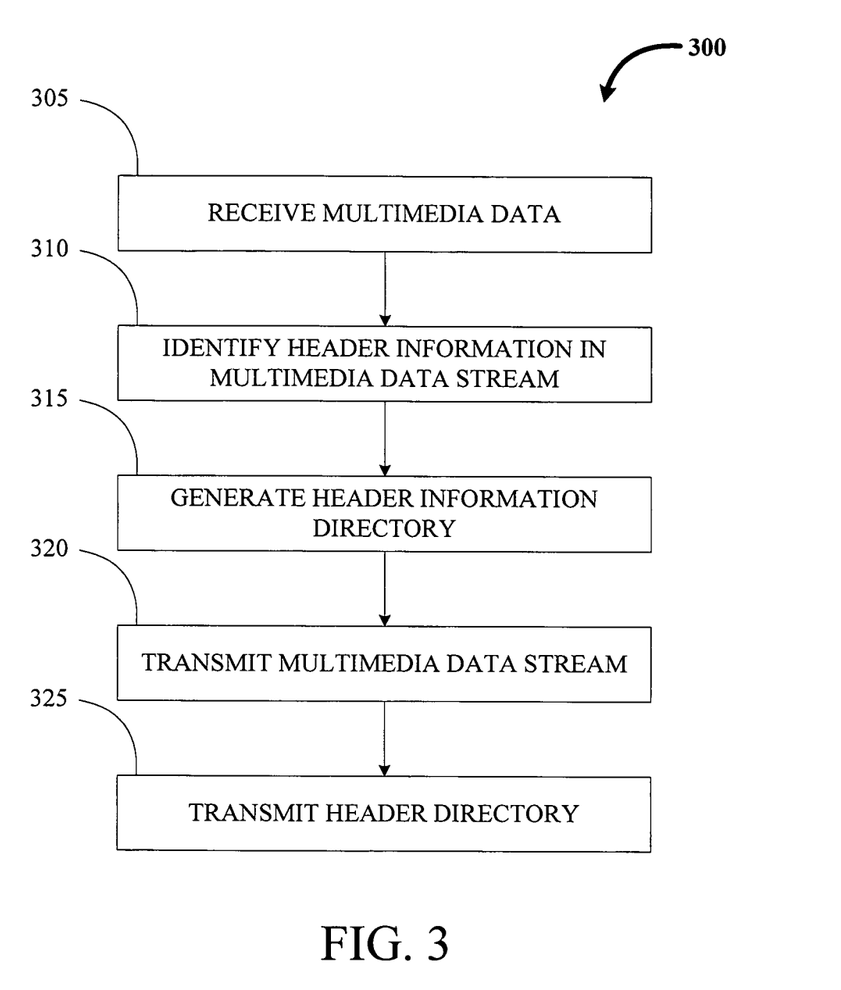
FIG. 3 is a flow diagram illustrating an example of a method for processing streaming multimedia data.

FIG. 3 is a flow diagram illustrating an example of a method for processing streaming multimedia data. Method 300 is a method of generating a directory comprising header information for use in a decoder to improve error resiliency. The method 300 starts by receiving, at state 305, a bitstream of multimedia data. Multiple bitstreams, e.g., video, audio and/or closed caption text may be included in a single bitstream. Receiving means such as the receiver/transmitter 140 of FIG. 1 may receive the multimedia bitstream at state 305.

Figure 4:
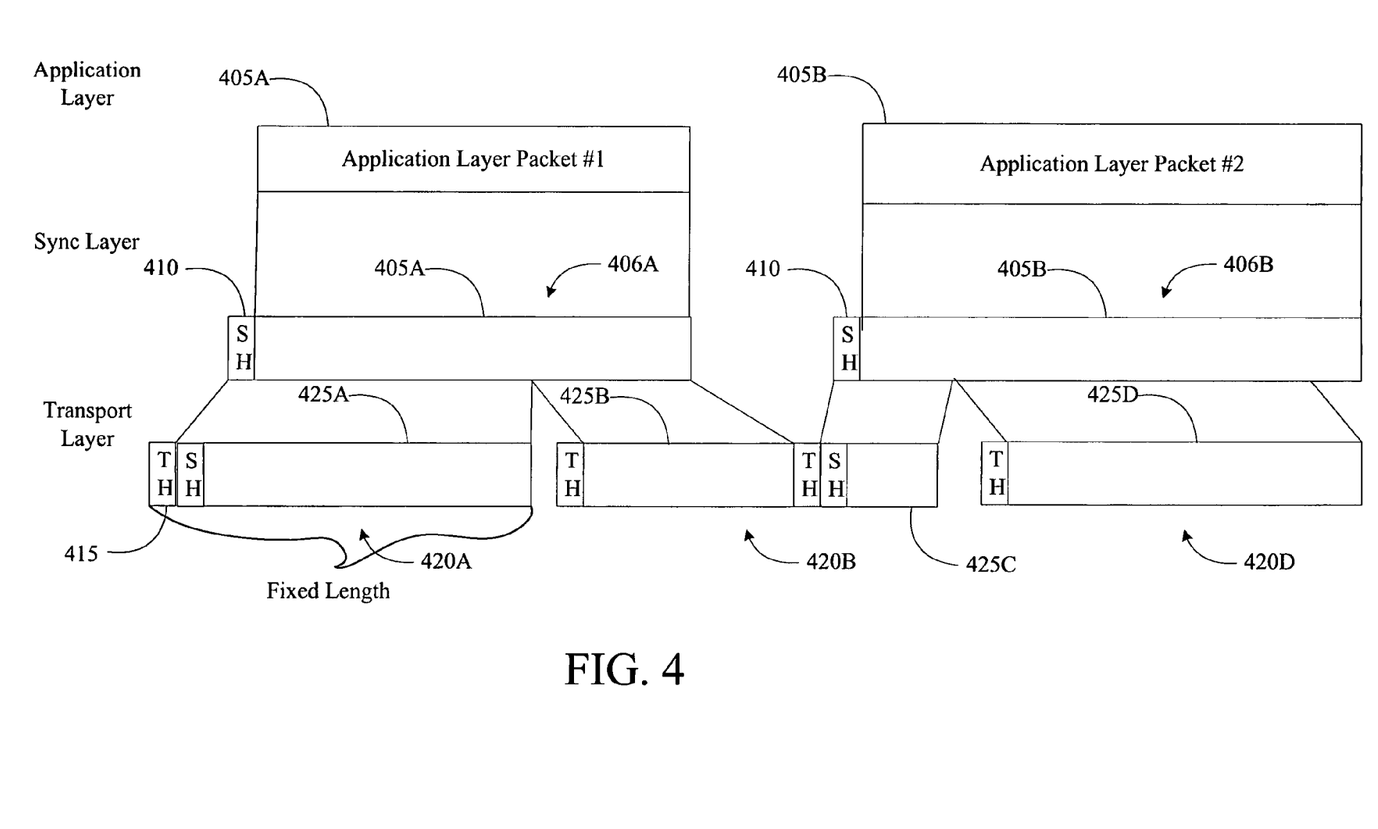
FIG. 4 is an illustration of an example of a multiple layer packetization scheme

After receiving the bitstream at state 305, the method identifies header information, at optional state 310, associated with the multimedia data in the bitstream. As discussed above, the header information may include information from multiple layers. FIG. 4 shows an illustration of an example of a multiple layer packetization scheme. In this example, application layer packets 405A and 405B may be fixed and/or variable length packets. A synchronization layer appends a synchronization layer header (sync header) 410 to each application layer packet 405A and 405B, resulting in sync layer packets 406A and 406B (the sync layer packets 406A and 406B in FIG. 4 include a sync layer header 410 and the application layer packets 405A and 405B, respectively). The sync layer packets 406A and 406B are then input to the transport layer. In this example, the transport layer packets are fixed length. The transport layer breaks down the sync layer packets into portions corresponding to the transport layer packet size and appends transport layer headers 415 to the resulting transport layer packets. In this example, the sync layer packet 406A comprising the application layer packet 405A is split into two transport layer packets 420A and 420B, where packet 420B includes the remaining portion 425B of the sync layer packet 406A and a first portion 425C of the sync layer packet 406B. In this example, an additional transport layer header 415 is appended to the portion 425C of the transport layer packet 420B, preceding the start of the next sync layer packet 406B. A third transport layer packet 420D contains the next portion 425D of the sync layer packet 406B.

The sync layer headers 410 and the transport layer headers 415 may contain similar information directed to enable a decoder to reassemble the synchronization layer packets and application layer packets. A header may include information such as a packet size, a packet number, a location of a header within a packet, a data sequence time, a data sequence duration, a frame time, a frame number, a random access point flag, a frame rate and/or a number of associated packets in a group. In addition, header information may include stream identification information identifying the associated packet as belonging to a video bitstream, an audio bitstream, and/or a closed caption bitstream.

Identifying means such as the header information identifier 115 of FIG. 1 may identify the header information in the multimedia bitstream at optional state 310.

The method 300 then generates, at state 315, a header information directory based on at least a portion of the header information identified, at state 310, in the multimedia bitstream. The directory may contain information pertaining to headers from multiple layers, e.g., the application layer, the sync layer and/or the transport layer, as well as other types of headers. The information contained in the directory can be used by a decoder to locate packet boundaries in a bitstream that contains erroneous data, to replace missing header information and/or to remove erroneous header information.

In some examples, the header information directory contains information identifying the boundaries of each of the packets, where the packets can be from any layer (e.g., transport, synchronization, application, or a combination thereof). The header information for a packet may identify the layer that the header corresponds to, the size of the packet and any other packets located within the packet as well as other information as discussed above. In other examples, a separate directory, or a distinct part of the directory, may be directed to separate layers (e.g., a transport layer directory, a sync layer directory etc.).

An example of a transport layer directory as generated at state 315 will now be discussed. This example represents the sync layer and transport layer relationship depicted in FIG. 4. In some examples such as the one shown in FIG. 4 (e.g., systems having fixed length transport layer packets, i.e. 122 bytes/packet), each transport layer header is a fixed length (e.g., a single byte long) and appears at least at the beginning of each transport layer packet. The format of the header may include an END FLAG field, where the END FLAG field can be a 1 bit flag that can be set to 1 if the current packet is the last segment of the sync layer packet and to 0 otherwise. The transport layer header may also include a BYTE_OFFSET field that may indicate the number of bytes used by the last segment of the sync layer packet (this also indicates where the next transport layer header may be found, as shown in FIG. 4 where a second transport layer header 415 in transport layer packet 420B is located between packet portions 425B and 425C). If a transport layer packet is less than 128 bytes then a 7 bit BYTE_OFFSET field may be sufficient. If there is no additional transport header in the current transport layer packet, then the BYTE_OFFSET field may be set to the length of the transport layer packet.

The directory generated with this transport header information may include the fields listed in Table 1.

TABLE 1

| Field Name | Field Description |
|---|---|
| NUMBER_OF_PACKETS | The number of packets listed in this header directory listing |
| (NUMBER_OF_PACKETS − 1) records of the following type | |
| PACKET_OFFSET | The number of bytes where the next packet starts |
| BYTE_OFFSET | The number of bytes within the current packet where another packet and/or packet header starts |

The NUMBER_OF_PACKETS field represents the number of packets being sent in the bitstream that are covered by the header directory message, i.e., subsequent records of PACKET_OFFSET and BYTE_OFFSET. The PACKET_OFFSET field entries point to the next packet in the group of packets. PACKET_OFFSET may be a number of bytes or bits or other number of data units to the end boundary of the packet. The BYTE_OFFSET field is used to locate an extra transport layer header within a packet such as the transport layer header 415 between the transport layer packet portions 425B and 425C in FIG. 4. In this example the valid range of the BYTE_OFFSET is 1 to 121. If more than one extra transport layer header may occur within a single transport layer packet, then another field defining the number of BYTE_OFFSET entries within a single packet can be used. In some examples, the PACKET_OFFSET and/or BYTE_OFFSET values are cumulative and represent the distance to advance in the bitstream from the last located packet header position that includes all previous advances.

The size of the fields may be preset or variable. For example, the NUMBER_OF_PACKETS field may be limited to a single byte, in which case a group of up to 255 sequentially numbered packets could be represented before the field would repeat. Therefore, if more than 255 transport layer packets may be required to fit the data of a single sync layer packet (using the example parsing shown in FIG. 4), then more bits may be required. The directory may contain one of the sets of entries as shown in Table 1 for predetermined groups of related packets. For example, each packet represented by the information in Table 1 may be contained in a single group of video data such as a frame, or a slice. Also, an audio or closed caption bitstream may have a separate directory containing similar fields.

In examples like this with fixed transport layer headers, upper layer components (e.g., sync layer and/or application layer) can use this known fixed header size to strip the headers on delivery and adjust the PACKET_OFFSET and BYTE_OFFSET entries in the header directory accordingly.

An example of a synchronization layer header directory generated at state 315 will now be discussed. In this example, a single synchronization layer packet (e.g., the sync layer header 410 and the application layer packet 405A) contains the video, audio and/or closed caption data of a frame of data. Other partitioned groups of data (e.g., a portion of a frame) could also be contained in a synchronization layer packet. The sync layer header directory can include fields similar to those listed in Table 1 above. In this example, however, the packets and the associated headers represent sync layer packets and headers. The sync layer packets would be made up of a number of transport layer packets (with the transport headers stripped) also referred to as blocks. An example of the sync layer header directory fields are listed in Table 2

TABLE 2

| Field Name | Field Description |
| --- | --- |
| NUMBER_OF_PACKETS | The number of sync layer packets listed in this header directory listing |
| (NUMBER_OF_PACKETS − 1) records of the following type | |
| BLOCK_OFFSET | The number of transport layer packets (blocks) where the next sync layer packet starts |
| BYTE_OFFSET | The number of bytes within the transport layer packet indicated by BLOCK_OFFSET where the next sync layer packet starts |

The NUMBER_OF_PACKETS field represents the number of transport layer packets that are covered by the subsequent records of BLOCK_OFFSET and BYTE_OFFSET. In addition, the NUMBER_OF_PACKETS field also represents the number of transport layer packets in a frame of video, audio and/or closed caption data to be displayed simultaneously. In examples where the size of the transport layer packets is fixed, the number of bits to advance is known by specifying the number of packets, as in this example. The BLOCK_OFFSET field points to the next sync layer packet (and the next multimedia frame in this example) in the group of sync layer packets being covered. The group of sync layer packets may be a predetermined number of frames. BLOCK_OFFSET may also be a number of bytes or bits or other number of data units. The BYTE_OFFSET field is used to locate the start of the next sync layer packet when it occurs within a transport layer packet such as the portion 425C comprising the start of the second sync layer packet 406B (including sync header 410 and application layer packet 405B) contained in the transport layer packet 420B shown in FIG. 4. In some examples, the BLOCK_OFFSET values are cumulative and represent the number of transport layer packets to advance in the bitstream from the last located block position that includes all previous advances.

The size of the fields may be preset or variable. For example, the NUMBER_OF_PACKETS field may be limited to a single byte, in which case a group of up to 255 sequentially numbered transport layer packets could be represented before the field would repeat. Therefore, if more than 255 transport layer packets may be required to fit the data of a single sync layer packet (using the example parsing shown in FIG. 4), then more bits may be required. The directory may contain one of the sets of entries as shown in Table 1 for predetermined groups of related packets. For example, each packet represented by the information in Table one may be contained in a single group of video data such as a frame, or a slice. Also, an audio or closed caption bitstream may have a separate directory containing similar fields.

In addition to the data contained in Table 2, the sync layer header directory, or a message containing the header directory information of Table 2, may also include one or more of the sync layer header directory fields listed in Table 3.

TABLE 3

| Field Name | Field Description |
| --- | --- |
| MESSAGE_ID | A field used to indicate that the message is a sync layer directory message |
| STREAM_ID | A field identifying the type of application (e.g., audio, video, and/or closed caption) that the header directory information is associated with |
| SIZE_OF_BLOCK_OFFSET | The number of bits used to represent the BLOCK_OFFSET field shown in Table 2 |
| SEQUENCE_TIME | A field specifying a sequence time to display the frame represented by the packets covered by this set. |
| FRAME_NUMBER | Identifies a unique frame number in a audio, video and/or closed caption sequence of other frames. |
| ENHANCEMENT_FLAG | Signals whether this frame refers to a video CODEC base layer or an enhancement layer (e.g., in a multi-layer coding scheme). |
| RAP_FLAG | This field indicates whether the frame following is a random access frame (e.g., an intra-coded frame) for reacquisition of a bitstream. |
| FRAME_RATE | In systems where frame rate can change dynamically, this field may indicate to a decoder when to display the frame. |
| UNREFERENCED_FRAME_FLAG | Signals whether a frame is a reference frame. (e.g., indicates whether the frame is used as a reference in the reconstruction of one or more other frames). |
| RESERVED | Reserved bits to provide padding for byte alignment of the header. |

Generating means such as the header directory generator shown in FIG. 1 may generate the header information directory at state 315.

The method 300 continues to optional state 320 where the multimedia data stream is transmitted. As discussed above in relation to FIG. 1, the multimedia data may be transmitted over the wired and/or wireless network 150. In this example, the header directory is transmitted at optional state 325. In some examples, the transmitting of the multimedia data at state 320 and the transmitting of the header directory at state 325 are done over separate channels. This may be done in order to provide different error protection levels or provide channel diversity, which may improve the error resiliency at a receiver. In some examples the one or both of the multimedia data stream or the header directory can be transmitted (states 320 or 325 respectively) over a virtual channel. A virtual channel may provide a degree of freedom to provide error protection that may be adjusted separately for the multimedia data and the header directory. Transmitting means such as the receiver/transmitter 140 shown in FIG. 1 may transmit the multimedia data stream at optional state 320, as well as transmit the header directory at optional state 325.

It should be noted that any one of the blocks illustrated in the flowchart shown in FIG. 3 may be omitted, rearranged in order, or combined with one or more other blocks.

Figure 5:
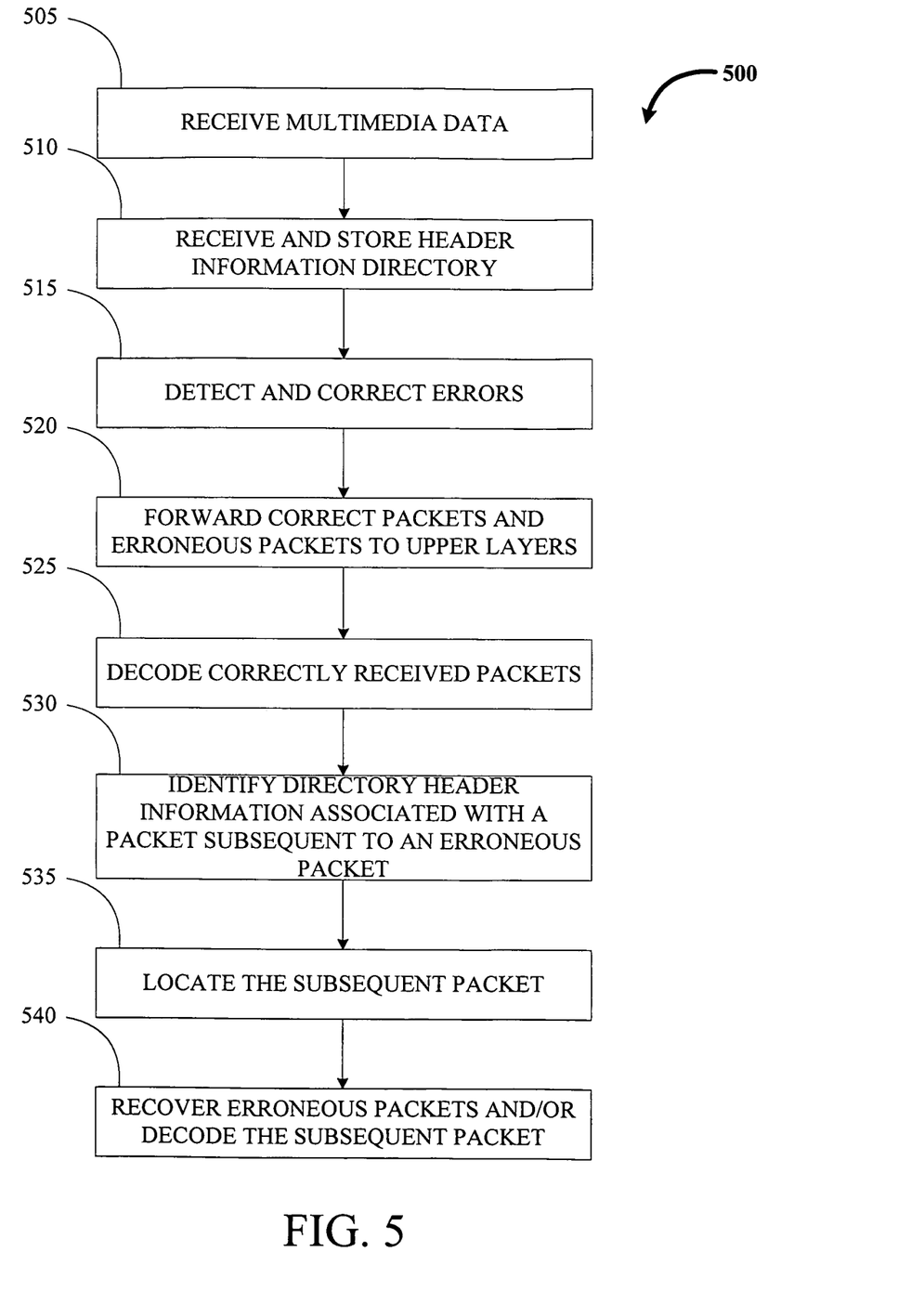
FIG. 5 is a flow diagram illustrating an example of a method for processing streaming multimedia data.

FIG. 5 is a flow diagram illustrating an example of a method for processing streaming multimedia data. The method 500 can be performed by the decoder device 110 shown in FIG. 1. The method 500 illustrates a use of the header information directory, generated using the method 300 discussed above, to improve error resiliency in the decoder device 110. Decoder device 110 receives, at state 505, a multimedia data stream comprising video, audio and/or closed caption data. The data may be encoded as discussed above where encoded data includes quantized data, transformed data, compressed data and combinations thereof. The multimedia data may include packetized data where the packetization may be performed at multiple levels. Receiving means such as the receiver 175 shown in FIG. 1 may receive the multimedia data at state 505.

The decoder device 110 also receives, at state 510, the header information directory. The header information directory may be contained in a message including one or more of the fields shown and described in Tables 1, 2 and 3 above. The directory may be received in separate parts such as a transport layer header directory as shown in Table 1 and a synchronization layer header directory as shown in Tables 2 and 3. The header information directory may be received over the same channel as the multimedia data is received 505. The header information directory may be received over a different channel than the multimedia data was received. In some examples one or both of the multimedia data and the header information directory can be received (at states 505 and 510, respectively) over a virtual channel. After receiving the header information directory, some or all of the header information directory may be stored into memory at state 510. Memory storing means such as the memory module 180 or the external storage module 185 shown in FIG. 1 may be used to store the header information directory at state 510.

At optional state 515, after receiving the multimedia data, the decoder device 110 may detect and correct errors that were introduced to the bitstream during transmission over the network 150. Various error detection and correction schemes known to those of skill in the art may be used to detect and correct the errors. Some errors may be uncorrectable and may result in erroneous packets. Erroneous packets may be marked (e.g., by setting a field to a value that indicates a packet to be in error) by flagging means such as the flagger 172 shown in FIG. 1. Marking erroneous packets as erroneous enables upper layer components to more easily identify the erroneous packets and initiate error recovery schemes. Erroneous packets may also be identified in the upper layers as being erroneous without any flagging information.

At optional state 520, the correct packets and the erroneous packets are forwarded to the upper layers (e.g., the synchronization layer and the application layer). In addition to forwarding the packets of the multimedia data, the header information directory is also forwarded or at least made available to the upper layers if needed. The multimedia packets forwarded to the upper layers may have one or more lower layer headers stripped and the header directory information that relates to packet size may be modified to reflect the removal of the lower layer headers.

The decoder device 110 decodes correctly received multimedia data packets at state 525. Decoding may include dequantizing, inverse transforming, decompressing and combinations thereof. The multimedia data packets may be in multiple bitstreams (e.g., video, audio and or closed caption) that may be decoded and played simultaneously. Since erroneous packets were forwarded at state 520, the decoding may be delayed until error recovery and/or resynchronization of decoding can take place.

When erroneous data is encountered, the header directory information can be used to identify individual subsequent packets (by identifying the packet boundaries locations), and possibly identify the application layer components that they are destined to, in order to better recover from the erroneous data. The decoder device 110 identifies, at optional state 530, header information contained in the header information directory that is associated with the erroneous packets in the bitstream. The decoder device 110 then locates, at optional state 535 the identified packet, e.g., using the PACKET_OFFSET information contained in the header directory, to advance to the subsequent packet in the bitstream. The identification at state 530 can be performed at any layer when an error is encountered including the transport layer, the synchronization layer and the application layer.

Referring to FIG. 4, assume that the second transport layer packet 420B (including partial transport layer packet portions 425B and 425C) is erroneous. Since it is erroneous, a decoder may not know that there is an extra transport layer header 415 located in the middle of the transport layer packet 420B. As discussed above, the extra transport layer header 415 is the start of the second synchronization layer packet 406B including sync header 410 and the application layer packet 405B. With the use of the header information directory, the location of the extra transport layer header 415 may be identified by referring to the BYTE_OFFSET field (shown in Table 1) of the header information record associated with the erroneous transport layer packet 420B. The transport layer then locates, at state 535, the extra transport layer packet header and parses the erroneous transport layer packet, strips the transport layer headers and forwards the two sync layer packets, both flagged as erroneous, to the synchronization layer. The synchronization layer can then identify the application layer components, using the information shown in Table 2 and 3, to forward the erroneous application layer packets 405A and 405B to their appropriate application layer component. Parsing means such as the parser 182 shown in FIG. 1 can perform the parsing described above.

As in this example, the identification at state 530 can take place, at least in part, at the synchronization layer, when information such as STREAM_ID shown in Table 3, is included in the header information directory. Individual application layer packets may be flagged and forwarded to the application components where they were destined to be decoded. In other examples, the directory header information may be forwarded (and possibly adjusted to reflect removal of any lower layer header data) to the application layer components where the identification of header information and location of packets at state 535 can take place. Identifying means such as the header information identifier 155 shown in FIG. 1 can identify 530 the directory header information associated with a packet (or packets) located subsequent to erroneous data. Locating means such as the packet locator 160 shown in FIG. 1 can locate the subsequent packet(s) at state 535.

After identifying the directory header information and locating one or more subsequent packets, the method 500 can perform error recovery to recover erroneous packets and/or resume decoding at the subsequent packet at optional state 540. Application layer components can utilize the identified and located packets to improve their error recovery schemes. In some examples, identified and located packets may be non-erroneous and the decoder can continue decoding with the packets obtained using the header directory information. Simply being able to identify the location of packets that would otherwise be unavailable (in the case of variable length packets) can be used to identify the areas of the bitstream that are erroneous. By identifying these areas, error recovery methods may be able to save and/or replace some of the data located subsequent to the erroneous data in the bitstream that may otherwise be discarded.

It should be noted that any one of the blocks illustrated in the flowchart shown in FIG. 5 may be omitted, rearranged in order, or combined with one or more other blocks.

An example provides an apparatus for processing multimedia data. The example apparatus includes means for receiving the multimedia data, and means for generating a directory, where the directory includes at least a portion of header information associated with the multimedia data. The means for receiving the multimedia data may comprise the receiver/transmitter 140 of FIG. 1. The means for generating the directory may comprise the header directory generator 120 of FIG. 1.

An example provides an apparatus for processing multimedia data. The example apparatus includes means for receiving a multimedia data stream, and for receiving a directory comprising at least a portion of header information associated with the multimedia data stream. The example apparatus also includes means for storing at least a portion of the directory. The means for receiving may comprise the receiver 175 of FIG. 1. The means for storing the directory may comprise the memory module 170 of FIG. 1.

Figure 6:
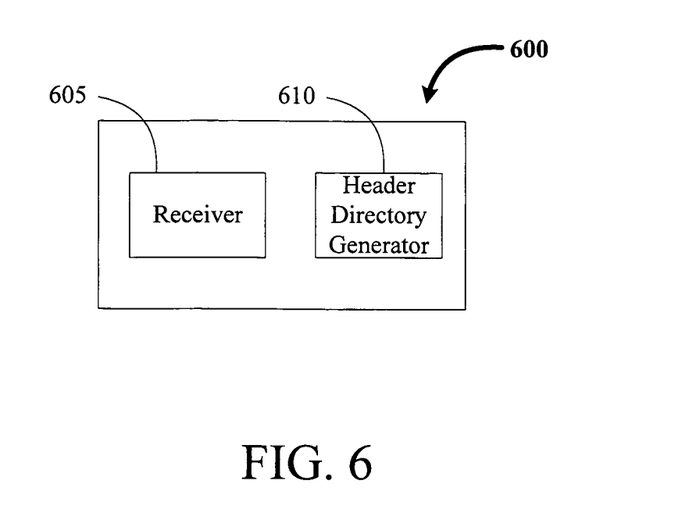
FIG. 6 shows a block diagram illustrating an example of an apparatus for processing multimedia data.

FIG. 6 shows a block diagram illustrating an example of an apparatus for processing multimedia data. The example apparatus 600 of FIG. 6 includes means for receiving the multimedia data, and means for generating a directory, where the directory includes at least a portion of header information associated with the multimedia data. The means for receiving the multimedia data may comprise a receiver 605 of FIG. 6. The means for generating the directory may comprise a header directory generator 610 of FIG. 6.

Figure 7:
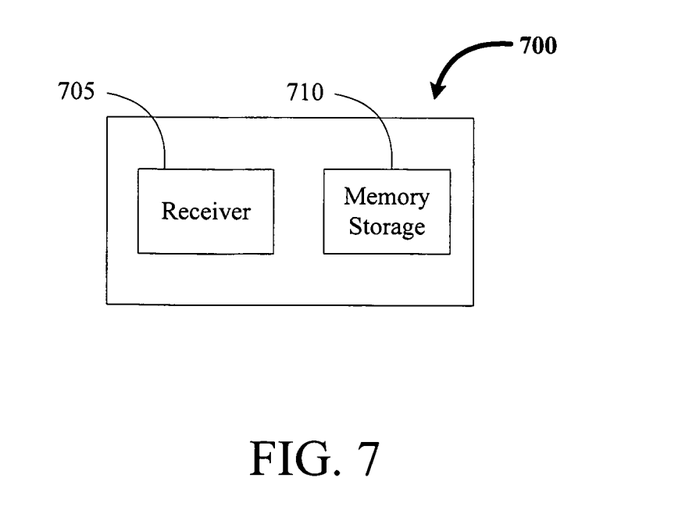
FIG. 7 shows a block diagram illustrating another example of an apparatus for processing multimedia data.

FIG. 7 shows a block diagram illustrating an example of an apparatus for processing multimedia data. The example apparatus includes means for receiving a multimedia data stream, and for receiving a directory comprising at least a portion of header information associated with the multimedia data stream. The example apparatus also includes means for storing at least a portion of the directory. The means for receiving may comprise a receiver 705 of FIG. 7. The means for storing the directory may comprise the memory storage module 710 of FIG. 7.

The examples given above have been depicted with headers and header information, where the header has been depicted as being at the front of a packet. It should be noted that the header information could be located at other position in a packet or in a separate bitstream from the packet.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added.

Thus, methods and apparatus to generate a header information directory comprising header information associated with a multimedia bitstream, and methods and apparatus to receive and use the header information directory to provide error management of the multimedia bitstream, have been described.

What is claimed is:

1. A method of processing multimedia data, comprising:
receiving a multimedia data stream including a plurality of packets in the multimedia data stream over a first communication link of a communications network;
receiving, over a second communication link of the communications network, the second communication link being different than the first communication link, a directory comprising at least a portion of header information associated with the multimedia data stream over the communications network from a device providing the multimedia data stream, the directory further comprising a plurality of records, each record associated with a portion of the multimedia data stream, wherein a record of the plurality of records includes information regarding a location of a respective portion of the multimedia data stream within a presentation sequence of the multimedia data stream, the respective portion comprising a random access frame; and
decoding at least a portion of the multimedia data stream using the directory.

2. The method of claim 1, further comprising locating a packet in the multimedia data stream based on one or more of the plurality of received records.

3. The method of claim 1, wherein the header information further comprises one or more of a packet size, a packet number, a location of a header within a packet, a frame number and a number of associated packets in a group.

4. The method of claim 1, wherein the first or second communication link comprises a virtual channel.

5. The method of claim 1, wherein the directory further comprises stream identification information identifying a packet in the multimedia data stream as at least one of an audio packet, a video packet and a closed caption packet.

6. The method of claim 1, wherein at least one of the plurality of packets is erroneous, the method further comprising:
identifying a portion of the directory information associated with a packet located subsequent to the erroneous packet in the multimedia data stream; and
using the identified portion of directory information in locating the subsequent packet in the multimedia data stream.

7. The method of claim 6, wherein the subsequent packet is located within the erroneous packet, the method further comprising:
parsing the subsequent packet from the erroneous packet; and
flagging the parsed packet as being erroneous.

8. The method of claim 1, wherein the multimedia data stream is packetized according to a multiple layer packetization scheme.

9. The method of claim 8, wherein the header information comprises data associated with packets included in one or more layers of the multiple layer packetization scheme, and wherein the directory further comprises a plurality of records, wherein a record comprises information regarding a location of a packet associated with one or more layers of the multiple layer packetization scheme.

10. The method of claim 9, wherein the method further comprises providing the directory to one or more decoding components associated with one or more layers of the multiple layer packetization scheme.

11. The method of claim 9, wherein at least one of the plurality of packets is erroneous, the method further comprising:
using a record associated with a first layer packet associated with a first layer of the multiple layer packetization scheme to identify the location of the at least one erroneous packet associated with a second layer of the multiple layer packetization scheme; and
flagging the erroneous packet as erroneous.

12. The method of claim 9, wherein at least one of the plurality of packets is erroneous, the method further comprising:
identifying a portion of the directory information associated with a packet located subsequent to the erroneous packet in the multimedia data stream, wherein the packet is associated with a first layer of the multiple layer packetization scheme; and
using the identified portion of directory information in locating the subsequent packet in the multimedia data stream, wherein the subsequent packet is associated with a second layer of the multiple layer packetization scheme.

13. The method of claim 1, further comprising decoding a second portion of the multimedia data stream using the header information included in the received multimedia data stream.

14. A processor for processing multimedia data, the processor configured to:
receive a multimedia data stream including a plurality of packets in the multimedia data stream over a first communications link of a communications network;
receive, over a second communications link of the communications network, the second communications link being different than the first communications link, a directory comprising at least a portion of header information associated with the multimedia data stream over the communications network from a device providing the multimedia data stream, the directory further comprising a plurality of records, each record associated with a portion of the multimedia data stream, wherein a record of the plurality of records includes information regarding a location of a respective portion of the multimedia data stream within a presentation sequence of the multimedia data stream, the respective portion comprising a random access frame; and
decode at least a portion of the multimedia data stream using the directory.

15. The processor of claim 14, wherein the processor is further configured to locate one of the packets in the multimedia data stream based on one or more of the plurality of received records.

16. The processor of claim 14, wherein at least one of the plurality of packets is erroneous and the processor is further configured to:
identify a portion of the directory information associated with a packet located subsequent to the erroneous packet in the multimedia data stream; and
locate the subsequent packet in the multimedia data stream using the identified portion of directory information.

17. The processor of claim 16, wherein the subsequent packet is located within the erroneous packet and the processor is further configured to:

parse the subsequent packet from the erroneous packet; and flag the parsed packet as being erroneous.

18. The processor of claim 14, wherein the multimedia data stream is packetized according to a multiple layer packetization scheme.

19. The processor of claim 18, wherein the header information comprises data associated with packets included in one or more layers of the multiple layer packetization scheme, and wherein the directory further comprises a plurality of records, wherein a record comprises information regarding a location of a packet associated with one or more layers of the multiple layer packetization scheme.

20. An apparatus for processing multimedia data, comprising:

a receiver configured to receive a multimedia data stream including a plurality of packets in the multimedia data stream over a first communications link of a communications network, wherein the receiver is further configured to receive, over a second communications link of the communications network, the second communications link being different that the first communications link, a directory comprising at least a portion of header information associated with the multimedia data stream over the communications network from a device providing the multimedia data stream, the directory further comprising a plurality of records, each record associated with a portion of the multimedia data stream, wherein a record of the plurality of records includes information regarding a location of a respective portion of the multimedia data stream within a presentation sequence of the multimedia data stream, the respective portion comprising a random access frame;

a memory to store at least a portion of the received directory; and a decoder configured to decode at least a portion of the multimedia data stream using the directory.

21. The apparatus of claim 20, further comprising a locator to locate one of the packets in the multimedia data stream based on one or more of the plurality of received records.

22. The apparatus of claim 20, wherein the header information further comprises one or more of a packet size, a packet number, a location of a header within a packet, a frame number, and a number of associated packets in a group.

23. The apparatus of claim 20, wherein the directory further comprises stream identification information identifying a packet in the multimedia data stream as at least one of an audio packet, a video packet and a closed caption packet.

24. The apparatus of claim 20, wherein at least one of the plurality of packets is erroneous, the apparatus further comprising:

an identifier to identify a portion of the directory header information associated with a packet located subsequent to the erroneous packet in the multimedia data stream; and a locator to locate the subsequent packet in the multimedia data stream using the identified portion of directory header information.

25. The apparatus of claim 24, wherein the subsequent packet is located within the erroneous packet, the apparatus further comprising:

a parser to parse the subsequent packet from the erroneous packet; and a flagger to flag the parsed packet as being erroneous.

26. The apparatus of claim 20, wherein the multimedia data stream is packetized according to a multiple layer packetization scheme.

27. The apparatus of claim 26, wherein the header information comprises data associated with packets included in one or more layers of the multiple layer packetization scheme, and wherein the directory further comprises a plurality of records, wherein a record comprises information regarding a location of a packet associated with one or more layers of the multiple layer packetization scheme.

28. The apparatus of claim 27, wherein the receiver is further configured to provide the directory to one or more decoding components associated with one or more layers of the multiple layer packetization scheme.

29. The apparatus of claim 27, wherein at least one of the plurality of packets is erroneous, and wherein the decoder is further configured to use a record associated with a first layer packet associated with a first layer of the multiple layer packetization scheme to identify the location of the at least one erroneous packet associated with a second layer of the multiple layer packetization scheme, and wherein the decoder is further configured to flag the erroneous packet as erroneous.

30. An apparatus for processing multimedia data, comprising:

means for receiving a multimedia data stream including a plurality of packets in the multimedia data stream over a first communications link of a communications network;

means for receiving, over a second communications link of the communications network, the second communications link being different from the first communications link, a directory comprising at least a portion of header information associated with the multimedia data stream over the communications network from a device providing the multimedia data stream, the directory further comprising a plurality of records, each record associated with a portion of the multimedia data stream, wherein a record of the plurality of records includes information regarding a location of a respective portion of the multimedia data stream within a presentation sequence of the multimedia data stream, the respective portion comprising a random access frame;

means for storing at least a portion of the directory; and means for decoding at least a portion of the multimedia data stream using the directory.

31. The apparatus of claim 30, further comprising:

means for locating a packet in the multimedia data stream based on one or more of the plurality of received records.

32. The apparatus of claim 30, wherein the header information further comprises one or more of a packet size, a packet number, a location of a header within a packet, a frame number, and a number of associated packets in a group.

33. The apparatus of claim 30, wherein the directory further comprises stream identification information identifying a packet in the multimedia data stream as at least one of an audio packet, a video packet and a closed caption packet.

34. The apparatus of claim 30, wherein at least one of the plurality of packets is erroneous, the apparatus further comprising:

means for identify a portion of the directory information associated with a packet located subsequent to the erroneous packet in the multimedia data stream; and means for locating the subsequent packet in the multimedia data stream using the identified portion of directory information.

35. The apparatus of claim 34, wherein the subsequent packet is located within the erroneous packet, the apparatus further comprising:

means for parsing the subsequent packet from the erroneous packet; and means for flagging the parsed packet as being erroneous.

36. The apparatus of claim 30, wherein the multimedia data stream is packetized according to a multiple layer packetization scheme.

37. The apparatus of claim 36, wherein the header information comprises data associated with packets included in one or more layers of the multiple layer packetization scheme, and wherein the directory further comprises a plurality of records, wherein a record comprises information regarding a location of a packet associated with one or more layers of the multiple layer packetization scheme.

38. The apparatus of claim 37, wherein apparatus further comprises means for providing the directory to one or more decoding components associated with one or more layers of the multiple layer packetization scheme.

39. The apparatus of claim 37, wherein at least one of the plurality of packets is erroneous, the apparatus further comprising:

means for using a record associated with a first layer packet associated with a first layer of the multiple layer packetization scheme to identify the location of the at least one erroneous packet associated with a second layer of the multiple layer packetization scheme; and means for flagging the erroneous packet as erroneous.

40. A non-transitory computer readable medium embodying a method of processing multimedia data, the method comprising:

receiving a multimedia data stream including a plurality of packets in the multimedia data stream over a first communications link of a communications network;

receiving, over a second communications link of the communications network, the second communications link being different than the first communications link, a directory comprising at least a portion of header information associated with the multimedia data stream over the communications network from a device providing the multimedia data stream, the directory further comprising a plurality of records, each record associated with a portion of the multimedia data stream, wherein a record of the plurality of records includes information regarding a location of a respective portion of the multimedia data stream within a presentation sequence of the multimedia data stream, the respective portion comprising a random access frame; and decoding at least a portion of the multimedia data stream using the directory.

41. The computer readable medium of claim 40, wherein the method further comprises locating a packet in the multimedia data stream based on one or more of the plurality of received records.

42. The computer readable medium of claim 40, wherein at least one of the plurality of packets is erroneous, the method further comprising:

identifying a portion of the directory information associated with a packet located subsequent to the erroneous packet in the multimedia data stream; and using the identified portion of directory information in locating the subsequent packet in the multimedia data stream.

43. The computer readable medium of claim 42, wherein the subsequent packet is located within the erroneous packet, the method further comprising:

parsing the subsequent packet from the erroneous packet; and flagging the parsed packet as being erroneous.

* * * * *